United States Patent
Vargantwar

(10) Patent No.: US 8,811,279 B1
(45) Date of Patent: Aug. 19, 2014

(54) OVERHEAD MESSAGE PRIORITIZATION BASED ON RATE OF ORIGINATIONS

(75) Inventor: Sachin R. Vargantwar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 442 days.

(21) Appl. No.: 13/025,234

(22) Filed: Feb. 11, 2011

(51) Int. Cl.
*H04W 4/00* (2009.01)
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ............ 370/328; 370/252; 455/434; 455/466

(58) Field of Classification Search
USPC ............................ 370/328, 252; 455/466, 434
See application file for complete search history.

(56) References Cited

U.S. PATENT DOCUMENTS

| 4,551,852 | A | 11/1985 | Grauel et al. |
| 4,573,206 | A | 2/1986 | Grauel et al. |
| 5,802,465 | A | 9/1998 | Hamalainen et al. |
| 5,953,665 | A | 9/1999 | Mattila |
| 6,185,422 | B1 | 2/2001 | Mattila |
| 6,374,103 | B1 * | 4/2002 | Kamel et al. ................... 455/434 |
| 6,469,992 | B1 | 10/2002 | Schieder |
| 7,464,313 | B2 | 12/2008 | Smith et al. |
| 7,483,699 | B2 | 1/2009 | Karmi et al. |
| 7,729,696 | B2 | 6/2010 | Harris et al. |
| 2003/0153340 | A1 * | 8/2003 | Crockett et al. .............. 455/518 |
| 2005/0007973 | A1 | 1/2005 | Jang et al. |
| 2006/0268768 | A1 | 11/2006 | Harris et al. |
| 2007/0153719 | A1 | 7/2007 | Gopal |
| 2007/0274343 | A1 | 11/2007 | Nishio |

OTHER PUBLICATIONS

U.S. Appl. No. 12/247,796, filed Oct. 8, 2008.
U.S. Appl. No. 12/253,312, filed Oct. 17, 2008.
U.S. Appl. No. 12/402,256, filed Mar. 11, 2009.
U.S. Appl. No. 12/471,636, filed May 26, 2009.
U.S. Appl. No. 12/561,363, filed Sep. 17, 2009.

* cited by examiner

*Primary Examiner* — Asad Nawaz
*Assistant Examiner* — Stephanie Chang

(57) ABSTRACT

A wireless communication system transmits overhead messages including a plurality of message types using a first priority scheme that identifies a first priority for transmitting the plurality of overhead messages based on the plurality of message types. The wireless communication system receives and processes call information to indentify a rate of call a rate of call originations. The rate of call originations is then processed to determine a second priority scheme that identifies a second priority for transmitting the plurality of overhead messages based on the plurality of message types if the rate of call originations exceeds a threshold. The wireless communication system then transmits the overhead messages using the second priority scheme if the rate of call originations exceeds the threshold.

16 Claims, 7 Drawing Sheets

| MESSAGE TYPE | PRIORITY | MINIMUM FREQUENCY | CYCLE | CAPSULE |
|---|---|---|---|---|
| QCONFIG | 1 | N/A | N/A | N/A |
| PAGE | 2 | N/A | N/A | N/A |
| APM | 3 | 1.8 ms | N/A | N/A |
| SPM | 3 | 1.8 ms | N/A | N/A |
| OTHER | 4 | N/A | N/A | N/A |

FIGURE 4A

| MESSAGE TYPE | PRIORITY | MINIMUM FREQUENCY | CYCLE | CAPSULE |
|---|---|---|---|---|
| QCONFIG | 1 | N/A | N/A | N/A |
| PAGE | 3 | N/A | N/A | N/A |
| APM | 2 | 0.9 ms | W/ SPM | W/ SPM |
| SPM | 2 | 0.9 ms | W/ APM | W/ APM |
| OTHER | 4 | N/A | N/A | N/A |

FIGURE 4B

OVERHEAD MESSAGE PRIORITIZATION BASED ON RATE OF ORIGINATIONS

TECHNICAL BACKGROUND

Wireless communications have become increasingly prominent for sending and receiving information. For example, individuals may utilize a wireless communication device for voice communications, research, entertainment, or for conducting critical business transactions. To support these services, a wireless communication network may perform communications via forward-link communication channels and reverse-link communication channels.

The forward-link communication channels typically carry communications from a wireless access network to wireless communication devices, while the reverse-link communication channels transfer communications from the wireless communication devices to the network. The forward-link communication channels may comprise control channels including pilot channels, sync channels, and paging channels. Paging channels are typically used by the wireless access network to notify wireless communication devices when a request to communicate has been received. The paging channels are also used to transmit various types of overhead messages and paging messages. Overhead messages are not addressed to any specific wireless communication device, but rather are intended for distribution to each mobile unit within a coverage area.

The reverse-link channels may comprise access channels that are primarily used for control and sending short messages such as call originations, page responses, and registration requests. The reverse-link channels are typically shared channels because multiple wireless communication devices must transmit over these channels. However, when multiple wireless communication devices attempt to transmit packets on a shared channel, collisions may occur.

OVERVIEW

A wireless communication system transmits overhead messages including a plurality of message types using a first priority scheme that identifies a first priority for transmitting the plurality of overhead messages based on the plurality of message types. The wireless communication system receives and processes call information to indentify a rate of call a rate of call originations. The rate of call originations is then processed to determine a second priority scheme that identifies a second priority for transmitting the plurality of overhead messages based on the plurality of message types if the rate of call originations exceeds a threshold. The wireless communication system then transmits the overhead messages using the second priority scheme if the rate of call originations exceeds the threshold.

BRIEF DESCRIPTION OF THE DRAWINGS

FIGS. 4A and 4B illustrate priority schemes used by a wireless communication system to control transmission of overhead messages.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
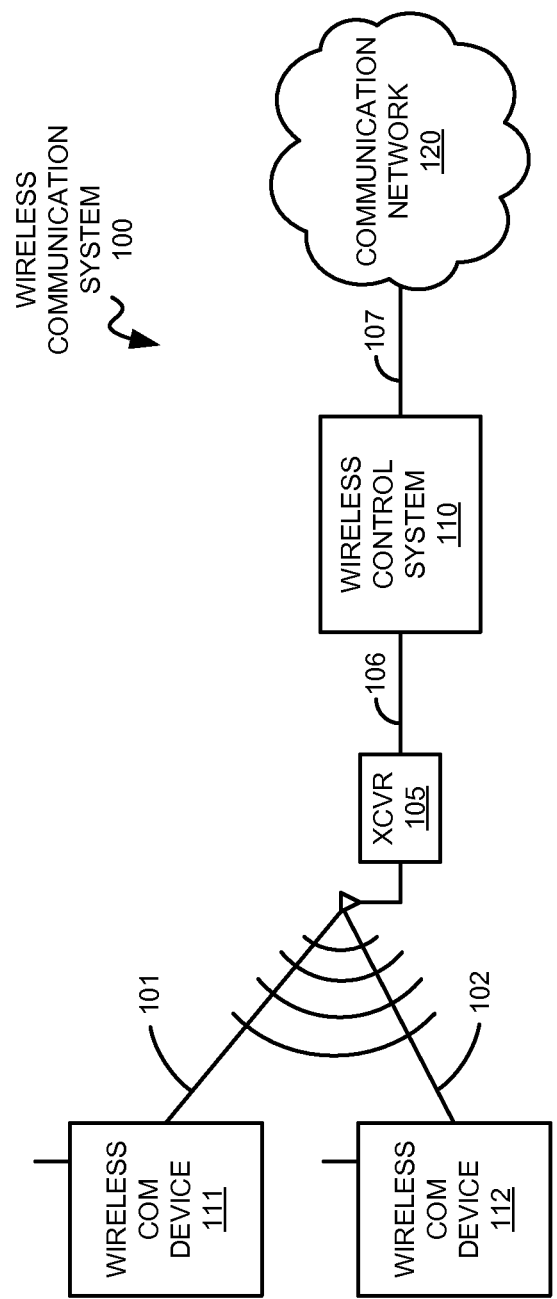
FIG. 1 illustrates a wireless communication system to control transmission of overhead messages.

FIG. 1 illustrates wireless communication system 100. Wireless communication system 100 comprises wireless communication devices 111 and 112, transceiver 105, wireless control system 110, and communication network 120. Transceiver 105 and wireless communication devices 111 and 112 are in communication over wireless links 101 and 102, respectively. Transceiver 105 and wireless control system 110 are in communication over communication link 106. Wireless control system 110 and control system 120 are in communication over communication link 107. In this example, two wireless communication devices are shown for simplicity. More or fewer wireless communication devices may be included in wireless communication system 100.

In operation, wireless control system 110 transmits overhead messages that include a plurality of message types using a first priority scheme. The first priority scheme identifies a first priority for transmitting the plurality of overhead messages based on the plurality of message types. The overhead messages are received by transceiver 105 and communicated to wireless communication devices 111 and 112. Wireless communication devices 111 and 112 may then attempt to access the network (i.e., an access network and/or communication network 120) by transmitting call information.

Wireless control system 110 receives and processes the call information to identify a rate of call originations and processes the rate of call originations to determine a second priority scheme that identifies a second priority for transmitting the plurality of overhead messages based on the plurality of message types if the rate of call originations exceeds a threshold.

Figure 2:
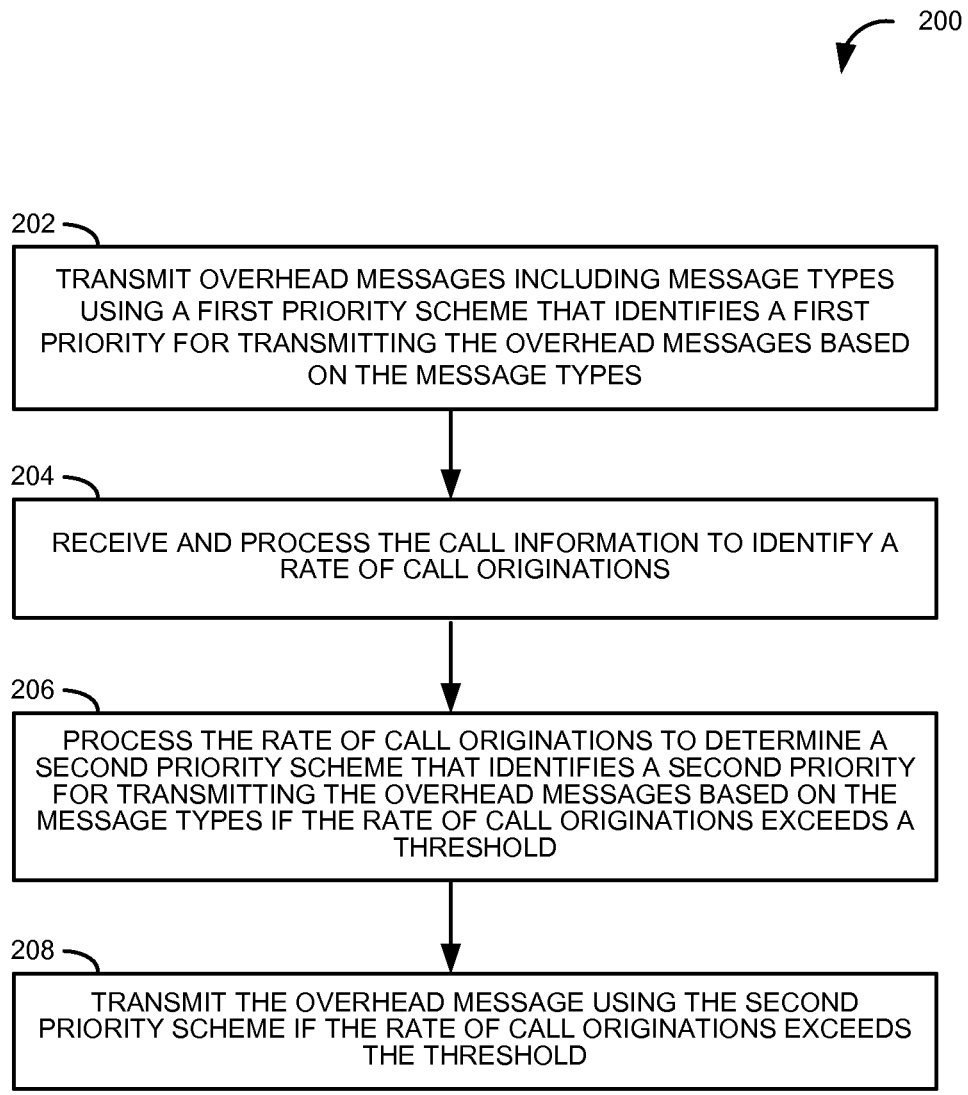
FIG. 2 illustrates the operation of a wireless control system in a wireless communication system to control transmission of overhead messages.

FIG. 2 illustrates the operation of wireless control system 110 in wireless communication system 100. Wireless control system 110 transmits overhead messages including message types using a first priority scheme that identifies a first priority for transmitting the overhead messages based on the message types (202). The overhead message types may comprise system parameters, access parameters, channel lists, and/or neighbor lists. In this example, the access parameter message type may include access parameters messages (APM) and/or a sector parameters messages (SPM). Similarly, paging messages and quick configuration (QCONFIG) messages may each comprise message types.

Wireless control system 110 receives and processes call information to identify a rate of call originations (204). For example, wireless communication devices 111 and/or 112 may transmit call information to transceiver 105. Transceiver 105 receives the information and relays the information to wireless control system 110 over communication link 106. The call information may indicate one or more call origination requests. The call origination requests may comprise voice call originations and/or page originations from one or more of a plurality of wireless communication devices.

Wireless control system 110 subsequently processes the rate of call originations to determine a second priority scheme that identifies a second priority for transmitting the overhead messages based on the message types if the rate of call originations exceeds a threshold (206). Lastly, if the rate of call originations exceeds the threshold, wireless control system 110 transmits the overhead messages using the second priority scheme.

Figure 3:
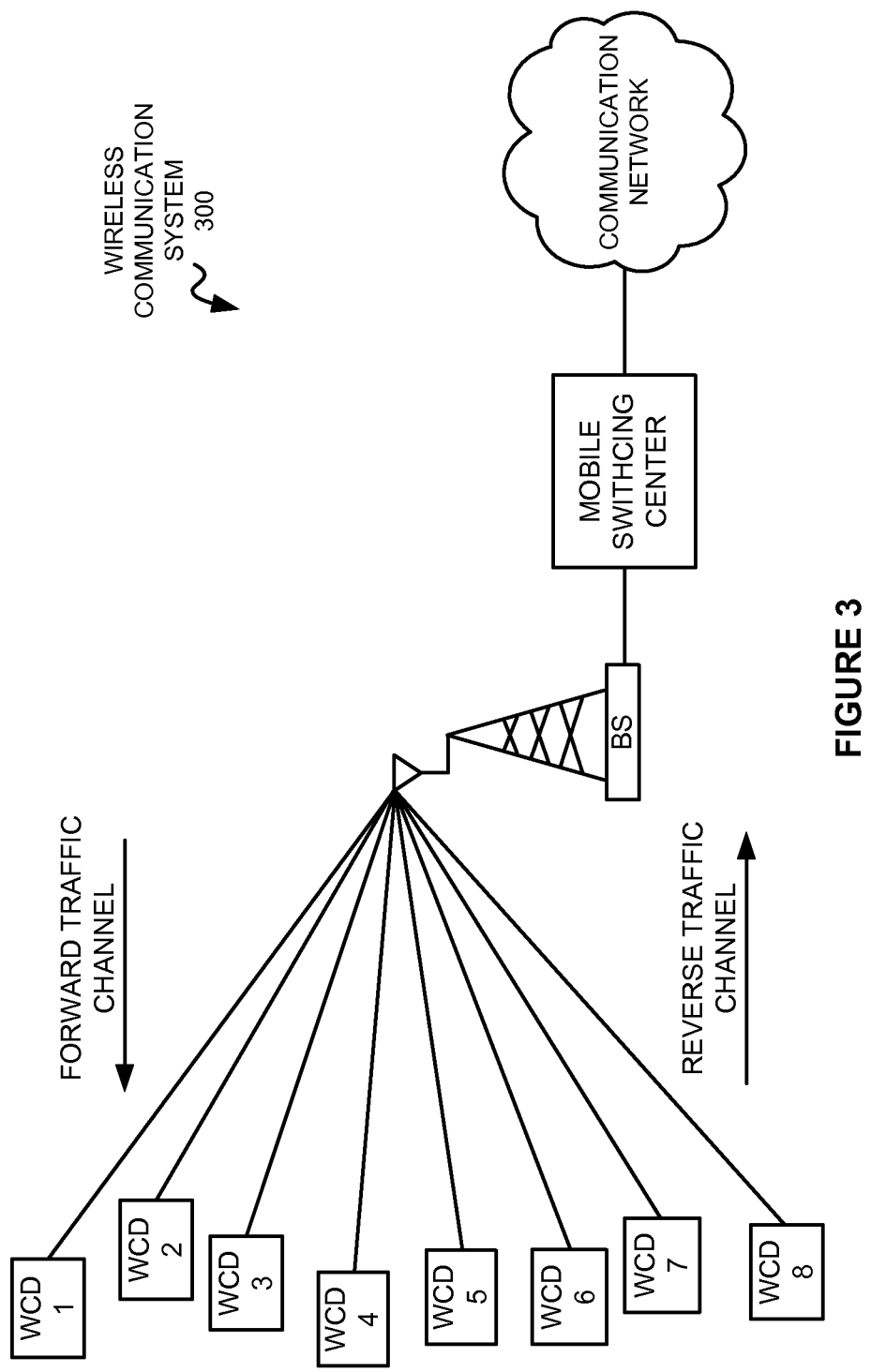
FIG. 3 illustrates a wireless communication system to control transmission of overhead messages.

FIG. 3 illustrates wireless communication system 300. Wireless communication system 300 comprises wireless communication devices WCD1-WCD8, a base station (BS), a mobile switching center (MSC), and a communication network. As shown, wireless communication devices WCD1-WCD8 are located within range of the base station. Each wireless communication device is shown with a link to the base station. In this example, the links represent both a forward-link communication channel and a reverse-link communication channel.

Forward-link communication channels may include control and data channels. The control channels may include pilot channels, sync channels, and paging channels. The data channels may include forward traffic channels. The pilot channel or pilot signal may serve to define the boundaries of the cell or sector area served by a base station. Moreover, in some instances the pilot signal may also provide for time reference and for amplitude and phase tracking and allows wireless communication devices to identify and become synchronized with the various base stations that are within range of their communication capability.

Reverse-link communication channels may include access channels and data channels. The access channels are primarily used for control and sending short messages such as call originations, page responses, and registration requests. The data channels may include reverse traffic channels.

The base station includes a transceiver configured to communicate with the wireless communication devices located within the sector or coverage area of the base station. In this example, wireless communication devices WCD1-WCD8 are located within the coverage area of the base station. The base station transceiver communicates over the forward-link and reverse-link communication channels. For example, the transceiver may transmit overhead messages for delivery to WCD1-WCD8 over the forward-link communication channel. Similarly, the transceiver my receive origination requests transmitted from WCD1-WCD8 over the reverse-link channel.

The overhead messages may contain information that enables wireless communication devices within range of the base station to communicate with the base station, and thereby with the communication network. Moreover, the overhead messages may comprise a plurality of message types such as, for example, QCONFIG messages, PAGE messages, APMs, and SPMs. The base station transceiver first transmits the overhead messages based on an initial priority that identifies a specific priority for transmitting the plurality of messages based on the message type. For example, the initial priority may indicate that QCONFIG message types have the highest priority followed by PAGE messages and then APM/SPM messages.

A wireless communication device receives the overhead messages and obtains information contained within the overhead message. For example, the overhead message may include current configuration information, access parameters, and/or version or sequence numbers. The wireless communication device initially captures this information when the device activates or roams into an associated network. The wireless communication device then stores this captured information in memory.

In some examples, the version number may comprise one or more signatures in signature fields. Each signature field may include a modulo count. A modulo count may be included for the version number or signature of the APM Likewise, a second modulo count may be included for the version number or signature of the SPM. The modulo count is typically increased or updated each time the value of the overhead message changes.

When a wireless communication device decides to access the network, the wireless communication device may transmit call information such as, for example, an origination request to the base station. An origination request may comprise, for example, an attempt by a wireless communication device to originate a voice call or to respond to a page. The base station may receive numerous origination requests from wireless communication devices WCD1-WCD8 during each access channel cycle. For example, during a mass calling event, numerous wireless communication devices attempt to access the network after capturing the same overhead message and either updating their configuration information or otherwise determining that the stored configuration information is up-to-date.

Thus, prior to transmitting an origination request, a wireless communication device must first ensure that the configuration information and the access parameter information maintained by the wireless communication device in memory are up-to-date. That is, the APM and/or SPM must be current before the origination request can be transmitted from the wireless communication device wanting to access the network.

In some wireless communication systems, particular overhead messages may be transmitted by the network as infrequently as possible. For example, a low priority overhead message such as APMs and SPMs may be transmitted as infrequently as once every 1.28 seconds. Thus, when the network updates any of the network's configurations information and/or access parameter information, the update is reflected in an updated sequence number and all of the wireless communication devices attempting to make an origination request must first obtain the updated information via one or more subsequent overhead messages.

The wireless communication devices may then attempt to access the network via the access channel. That is, the wireless communication devices may attempt to access the network after capturing the same overhead message and either updating their configuration information or otherwise determining that the stored configuration information is up-to-date. However, the longer the period between transmission of overhead messages, the greater the number of wireless communication devices that are likely to be attempting to originate a connection or respond to a page in a time period substantially immediately after the last required overhead message. The greater the number of wireless communication devices attempting to access the network, the greater the likelihood of collisions.

In some wireless networks, the wireless communication devices communicate through a shared wireless medium, in this case, the access channel. When multiple wireless communication devices try to transmit packets on the access channel, collisions may occur. To avoid the possibility of collisions during mass calling events, the rate of call originations are processed to determine a new priority scheme that identifies a new priority for transmitting the plurality of message types within the overhead messages if the rate of call originations exceeds a threshold. In one example, the base station processes the origination requests to determine a rate of call originations. In other examples, the mobile switching center processes the origination requests to determine the rate of call originations. In yet other examples, processing the origination requests to determine the rate of call originations is distributed among both the base station and the mobile switching station.

The new priority scheme that identifies another priority for transmitting the plurality of message types within the overhead messages if the rate of call originations exceeds a threshold may result in some message types being transmitted more frequently than they otherwise would have been. For example, the new priority may indicate that QCONFIG message types have the highest priority followed by APMs and SPMs, and then PAGE messages.

FIGS. 4A and 4B illustrate initial and updated or new priority schemes, respectively. The initial and updated priority schemes are used by wireless communication system 300 to control transmission of overhead messages. Referring first to FIG. 4A which illustrates an initial priority scheme used by the base station and/or MSC of FIG. 3 to transmit overhead messages. The overhead messages are transmitted based on the initial priority which identifies a specific priority for transmitting the plurality of messages based on the message type.

As shown, FIG. 4A comprises a first column labeled MESSAGE TYPE and remaining columns from left to right labeled PRIORITY, MINIMUM FREQUENCY, CYCLE, and CAPSULE. Each row represents a type of overhead message and indicates information about that type of overhead message. For example, the initial priority indicates that QCONFIG messages have the highest priority (i.e., a priority set to 1) followed by PAGE messages (i.e., a priority set to 2) and then APM/SPM messages (i.e., a priority set to 3). In this example, the priorities are ranked. However, the each type of overhead message could also be assigned a numerical value. Other indicators may also be used.

The MINIMUM FREQUENCY column indicates the minimum time that can elapse between transmissions of a specific type of overhead message. In this example, APMs and SPMs must be transmitted at least once every 1.8 ms, but QCONFIG messages, PAGE messages, and OTHER messages do not have a minimum frequency.

Referring now to FIG. 4B which illustration an updated priority scheme used by the based station and/or the MSC of FIG. 3 to transmit overhead message. In some examples, the overhead messages are transmitted based on the updated priority which identifies a specific priority for transmitting the plurality of messages based on the message type. In this example, the updated priority scheme indicates the priority scheme that may be used during a mass calling event.

In this example, APMs and SPMs are given a higher priority and must be transmitted more frequently. Specifically, the updated priority scheme indicates that an APM and an SPM must be transmitted at least once every 0.9 ms. Furthermore, the CYCLE and CAPSULE columns indicate that the APM should be transmitted in the same cycle and capsule as the SPM, if possible. Likewise, the CYCLE and CAPSULE columns indicate that the SPM should be transmitted in the same cycle and capsule as the APM, if possible.

Assigning the APMs and SPMs a higher priority ensures that the wireless network transmit these types of messages more frequently. The wireless communication devices may then be able to access the network quicker after capturing the overhead messages and either updating their configuration information or otherwise determining that the stored configuration information is up-to-date. The shortened period between transmissions of overhead messages may result in fewer wireless communication devices attempting to originate a connection or respond to a page in a time period substantially immediately after the last required overhead message. Accordingly, fewer collisions may occur in the access channel.

Figure 5:
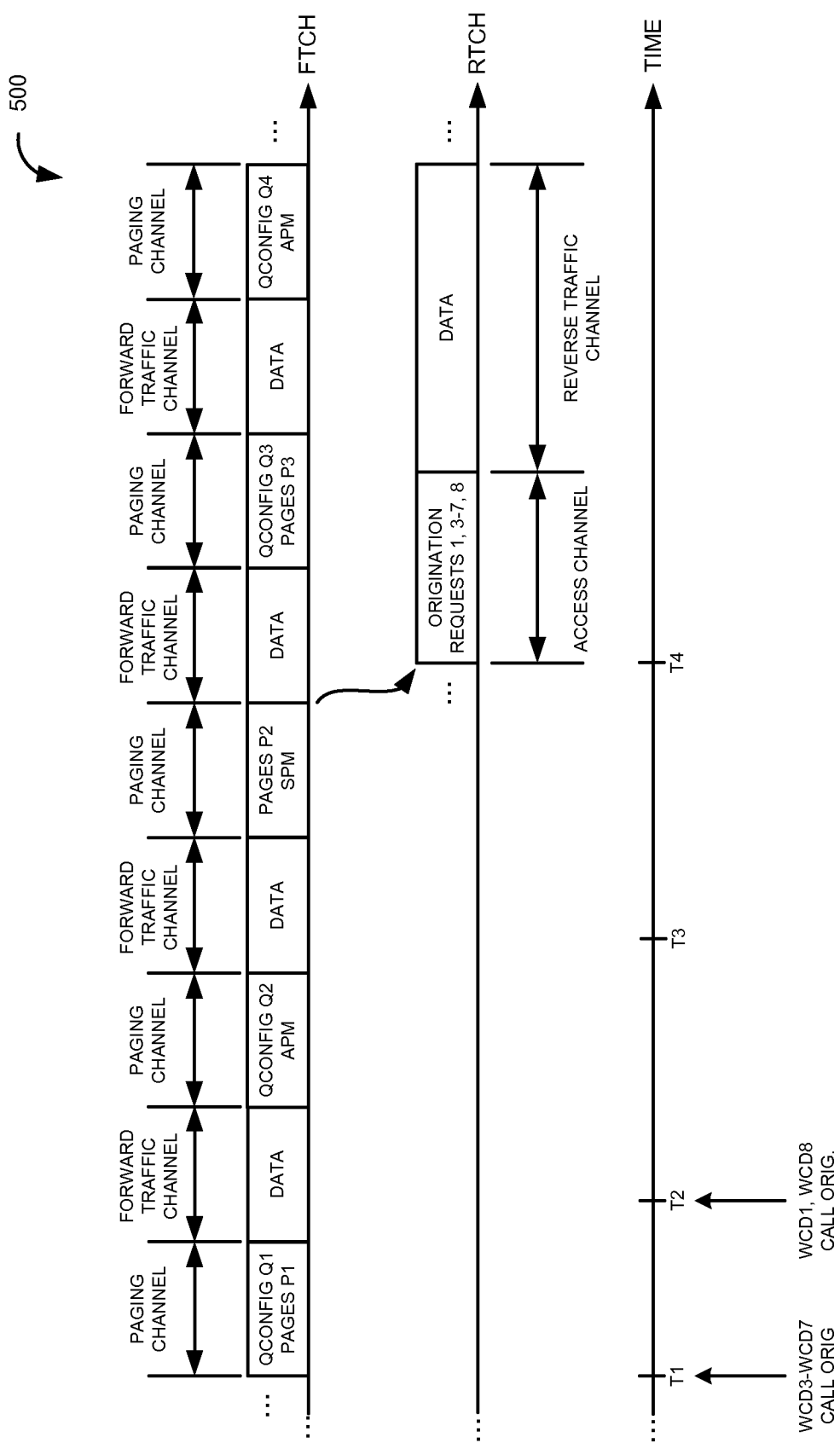
FIG. 5 illustrates forward and reverse traffic channels in a wireless communication system to control transmission of overhead messages.

FIG. 5 illustrates forward and reverse traffic channels in wireless communication system 300, according to an example of operation. In this example, wireless communication system 300 controls transmission of overhead messages using the initial priority scheme discussed in FIG. 4A. The example illustrates numerous wireless communication devices attempting to access the network during the same access channel increasing the likelihood of collisions.

As shown, the forward traffic channel (FTCH) includes five cycles of the paging channel and four cycles of the forward traffic channel transmitted from the base station. At time T1, the base station begins transmission of QCONFIG message Q1 followed by PAGES message P1 in the first paging cycle. The paging cycles discussed with reference to FIG. 5 and FIG. 6 may also include one or more version numbers which are not shown for simplicity. Moreover, each message may include one or more messages that may be included in one or more capsules within each cycle.

The first forward traffic channel cycle follows the first paging cycle. The forward traffic channels may carry data associated with various communication sessions to the individual wireless communication devices involved in those sessions. The second paging cycle follows the first forward traffic channel cycle. In this example, the second paging cycle includes QCONFIG message Q2 followed by the current APM. The second paging cycle is followed by the second forward traffic channel cycle. The second forward traffic channel cycle is followed by the third paging cycle. The third paging cycle includes PAGES message P2 followed by the current SPM. The third forward traffic channel cycle is follows the third paging cycle. The fourth paging cycle follows the third forward traffic channel cycle. The fourth paging cycle includes QCONFIG message Q3 and PAGES P3. The fourth forward traffic channel cycle follows the fourth paging cycle. The fifth paging cycle follows the fourth forward traffic channel cycle. The fifth paging cycle includes QCONFIG messages Q4 and the APM.

At time T1, wireless communication devices WCD3-WCD7 need to access the network. In this example, the need to access the network determined at time T1 comprises a need by wireless communication devices WCD3-WCD7 to originate voice calls or pages. As discussed, in order to access the network wireless communication devices WCD3-WCD7 must first transmit an origination request. However, the origination requests cannot be transmitted by wireless communication devices WCD3-WCD7 until the devices capture current configuration information transmitted from the base station in overhead messages. In particular, wireless communication devices WCD3-WCD7 must first ensure that they capture the most recent APM and SPM combination. Once the current APM/SPM combination is captured, wireless communication devices WCD3-WCD7 may either update their configuration information or otherwise determine that the stored configuration information is up-to-date and transmit an origination request on the next access channel cycle in the reverse traffic channel (RTCH).

At time T2, wireless communication devices WCD1 and WCD8 need to access the network. The need to access the network determined at time T2 comprises a need by wireless communication devices WCD1 and WCD8 to respond to received pages. Specifically, in this example, PAGES P1 included paging messages for WCD1 and WCD8. Shortly after receiving these paging messages, WCD1 and WCD8 determine a need to access the network to respond to these received paging messages. However, the origination requests cannot be transmitted by wireless communication devices WCD1 and WCD7 until the devices capture the most recent APM and SPM combination. Once the current APM/SPM combination is captured, wireless communication devices WCD1 and WCD7 may either update their configuration information or otherwise determine that the stored configuration information is up-to-date and transmit an origination request on the next access channel cycle in the reverse traffic channel (RTCH).

As discussed, the second FTCH paging channel includes the APM and the third FTCH channel includes the SPM, and thus the wireless communication devices that need to access the network can do so after the third FTCH paging channel. As shown, the RTCH includes a single access channel cycle and a single reverse traffic channel cycle. A single access channel cycle and reverse traffic channel cycle are shown for simplicity. Wireless communication system 300 may include any number of reverse channel cycles. In this example, the RTCH access channel is shown at time T4, following shortly after the third FTCH paging channel. The access channel includes ORIGINATION REQUESTS 1 and 3-8 corresponding to wireless communication devices WCD1, and WCD3-WCD8.

In some wireless networks, the wireless communication devices communicate through a shared wireless medium, in this case, the access channel. When multiple wireless communication devices try to transmit packets on the access channel, collisions may occur. In this example, there are numerous wireless communication devices attempting to access the network during the same access channel increasing the likelihood of collision.

Figure 6:
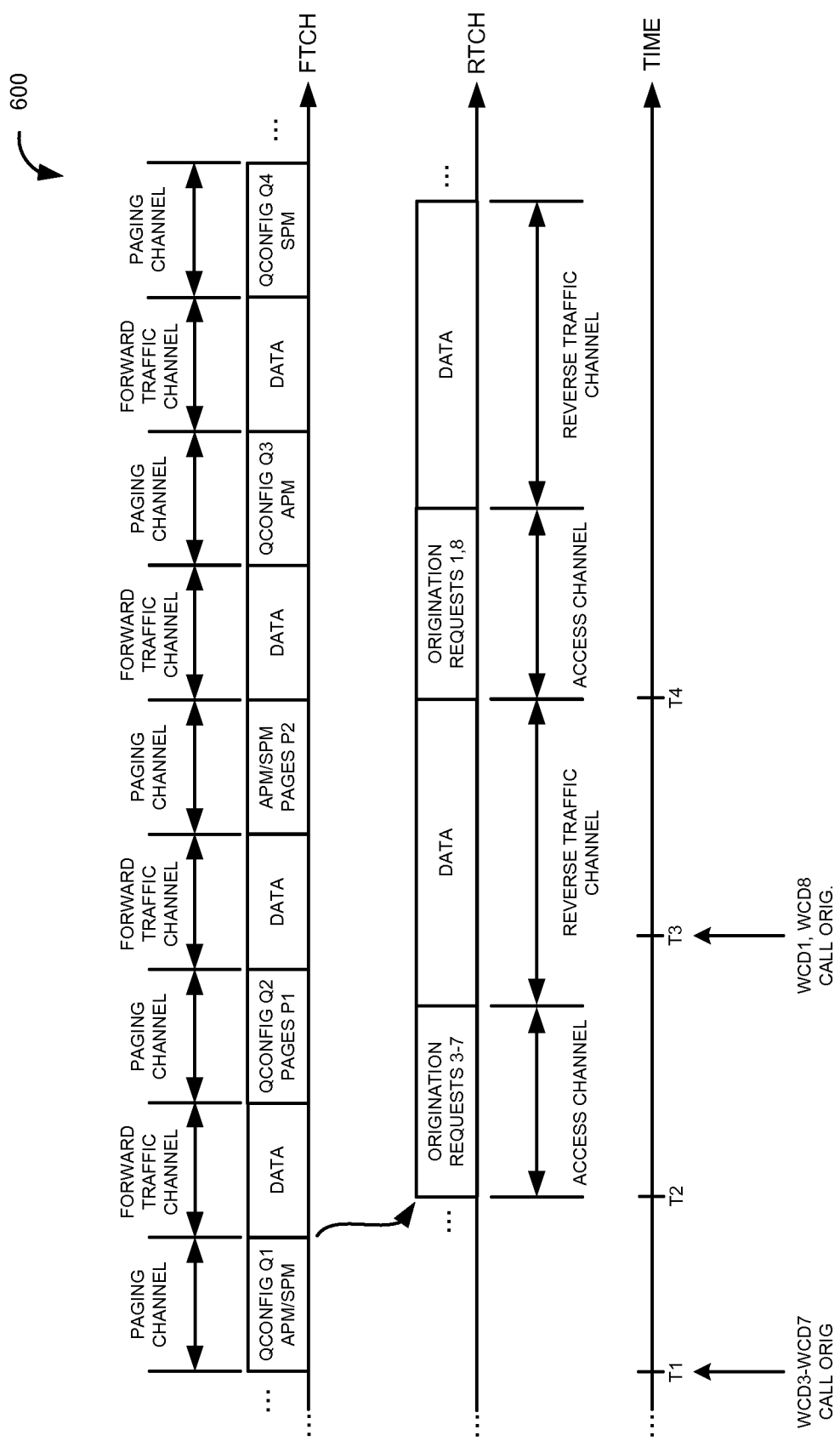
FIG. 6 illustrates forward and reverse traffic channels in a wireless communication system to control transmission of overhead messages.

FIG. 6 illustrates the forward and reverse traffic channels in wireless communication system 300, according to another example of operation. In this example, wireless communication system 300 controls transmission of overhead messages using the updated priority scheme discussed in FIG. 4B. The example illustrates increased transmission of specific overhead messages to reduce the number of wireless communication devices attempting to access the network during the same access channel, and thus decreasing the likelihood of collisions.

As shown, the forward traffic channel (FTCH) includes five cycles of the paging channel and four cycles of the forward traffic channel transmitted from the base station. At time T1, the base station begins transmission of QCONFIG message Q1 followed by the APM and SPM in the first paging cycle. The paging cycles may also include one or more version numbers which are not shown for simplicity. Moreover, each message may include one or more messages that may be included in one or more capsules within the cycle. In this example, wireless communication system 300 uses the updated priority scheme to replace the PAGES message P1 of FIG. 5 with the APM/SPM combination in the first paging cycle resulting in faster network access for wireless communication devices WCD3-WCD7.

The first forward traffic channel follows the first paging cycle. The forward traffic channels may carry data associated with various communication sessions to the individual wireless communication devices involved in those sessions. The second paging cycle follows the first forward traffic channel cycle. In this example, the second paging cycle includes QCONFIG message Q2 followed by PAGES message P1. The second paging cycle is followed by the second forward traffic channel. The second forward traffic channel is followed by the third paging cycle. The third paging cycle includes the APM and SPM followed by PAGES message P2. The third forward traffic channel cycle is follows the third paging cycle. The fourth paging cycle follows the third forward traffic channel cycle. The fourth paging cycle includes QCONFIG message Q3 and the APM. The fourth forward traffic channel follows the fourth paging cycle. The fifth paging cycle follows the fourth forward traffic channel cycle. The fifth paging cycle includes QCONFIG messages Q4 and the SPM.

At time T1, wireless communication devices WCD3-WCD7 need to access the network. In this example, the need to access the network determined at time T1 comprises a need by wireless communication devices WCD3-WCD7 to originate voice calls or pages. As discussed, in order to access the network wireless communication devices WCD3-WCD7 must first transmit an origination request. However, the origination requests cannot be transmitted by wireless communication devices WCD3-WCD7 until the devices capture current configuration information transmitted from the base station in overhead messages. In particular, wireless communication devices WCD3-WCD7 must first ensure that they capture the most recent APM and SPM combination. Once the current APM/SPM combination is captured, wireless communication devices WCD3-WCD7 may either update their configuration information or otherwise determine that the stored configuration information is up-to-date and transmit an origination request on the next access channel cycle in the reverse traffic channel (RTCH).

As discussed, the first FTCH paging channel includes the APM and SPM, and thus the wireless communication devices that need to access the network can do so after the first FTCH paging channel. As shown, the RTCH includes two access channel cycles and two reverse traffic channel cycles. Wireless communication system 300 may include any number of reverse channel cycles. In this example, the first RTCH access channel is shown at time T2, following shortly after the first FTCH paging channel. The access channel includes ORIGINATION REQUESTS 3-7 corresponding to wireless communication devices WCD3-WCD7.

At time T3, wireless communication devices WCD1 and WCD8 need to access the network. The need to access the network determined at time T3 comprises a need by wireless communication devices WCD1 and WCD8 to respond to received pages. Specifically, in this example, PAGES message P1 included paging messages for WCD1 and WCD8. Shortly after receiving these paging messages, WCD1 and WCD8 determine a need to access the network to respond to these received paging messages. However, the origination requests cannot be transmitted by wireless communication devices WCD1 and WVD7 until the devices capture the most recent APM and SPM combination. Once the current APM/SPM combination is captured, wireless communication devices WCD1 and WVD7 may either update their configuration information or otherwise determine that the stored configuration information is up-to-date and transmit an origination request on the next access channel cycle in the reverse traffic channel (RTCH).

As discussed, the third FTCH paging channel includes the current APM and SPM, and thus the wireless communication devices that determined a need to access the network before the third paging channel can do so after the third FTCH paging channel. In this example, wireless communication devices WCD1 and WCD8 access the second RTCH access channel at time T4, following shortly after the third FTCH paging channel. The access channel includes ORIGINATION REQUESTS 1 and 8 corresponding to wireless communication devices WCD1 and WCD8.

Thus, in this example, the increased transmission of APM and SPM overhead messages based on the updated priority scheme reduces the number of wireless communication devices attempting to access the network during the same access channel, and thus decreases the likelihood of collisions.

Figure 7:
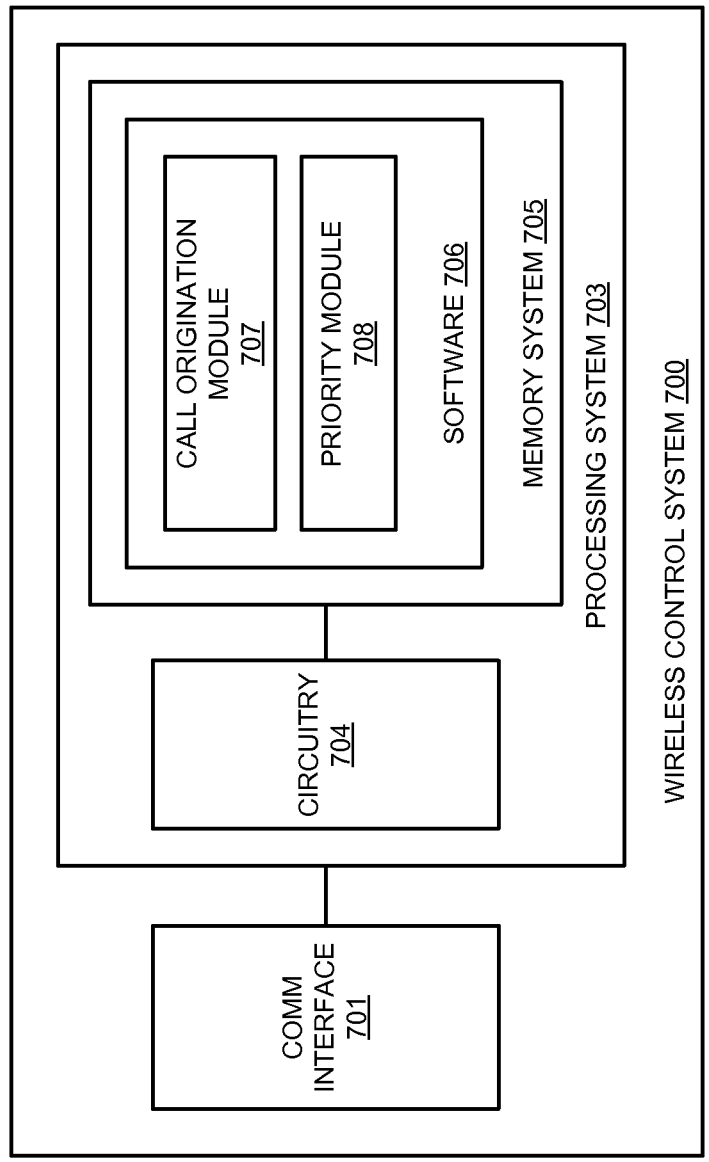
FIG. 7 illustrates a wireless control system to control transmission of overhead messages.

FIG. 7 illustrates a wireless control system 700 to control transmission of overhead messages. Wireless control system 700 provides an example of wireless control system 110 of FIG. 1, and the base station and/or MSC of FIG. 3, although these systems may use alternative configurations. Wireless control system 700 comprises communication interface 701, network interface 702, and processing system 703. Processing system 703 is linked to access interface 701 and network interface 702. Processing system 703 includes processing circuitry 704 and memory system 705 that stores operating software 706. Operating software 706 comprises software modules 707-708.

Communication interface 701 includes a network router and gateway equipment for communicating with access and/or communication networks of a wireless communication provider, such as with communication network 120. Communication interface 701 exchanges user communications and overhead communications with a communication network of a wireless communication system over a link to provide communication services, omitted for clarity. The link could use various protocols or communication formats as described herein, including combinations, variations, or improvements thereof.

Communication interface 701 may also include transceiver equipment such as, for example, transceiver 105, and antenna elements for exchanging user communications and overhead communications with wireless communication devices in a mobile communication system. In some examples, two or more links are used to communicate with a single mobile communication device using different spreading codes. In this case, communication interface 701 receives command and control information and instructions from processing system 703 for controlling transmission power of the transceiver equipment and the operations of wireless communication devices over the links, as well as for coordinating handoffs of mobile communication devices between other wireless access nodes or base stations. The links could each use various protocols or communication formats as described herein, including combinations, variations, or improvements thereof.

Processing circuitry 704 comprises microprocessor and other circuitry that retrieves and executes operating software 706 from memory system 705. Processing circuitry 704 may comprise single device or be distributed across multiple devices—including devices in different geographic areas. Processing circuitry 704 may be embedded in various types of equipment.

Memory system 705 comprises a non-transitory storage medium, such as a disk drive, flash drive, data storage circuitry, or some other memory apparatus. Memory system 705 may comprise single device or be distributed across multiple devices—including devices in different geographic areas. Memory system 705 may be embedded in various types of equipment.

Operating software 706 comprises computer programs, firmware, or some other form of machine-readable processing instructions. Operating software 706 may include an operating system, utilities, drivers, network interfaces, applications, or some other type of software. In this example, operating software 706 also comprises software modules 707-708, although software 706 could have alternative configurations.

When executed by processing circuitry 704, operating software 706 directs processing system 703 to operate as described herein to update overhead message version numbers. In particular, call origination module 707 receives call information, processes the call information to identify a rate of call originations, and compares the rate of call originations to a threshold value. Priority module 708 processes the rate of call originations to determine a priority scheme that identifies a priority for transmitting the plurality of overhead messages based on the plurality of message types if the rate of call originations exceeds the threshold.

Referring back to FIG. 1, wireless communication devices 111 and 112 comprise Radio Frequency (RF) communication circuitry and an antenna. The RF communication circuitry typically includes an amplifier, filter, modulator, and signal processing circuitry. Wireless communication devices 111 and 112 may also include a user interface, memory device, software, processing circuitry, or some other communication components. Wireless communication devices 111 and 112 could be telephones, transceivers, mobile phones, cellular phones, smartphones, computers, personal digital assistants (PDA), e-books, game consoles, mobile Internet devices, wireless network interface cards, media players, or some other wireless communication apparatus—including combinations thereof. Wireless network protocols that may be utilized by wireless communication devices 111 and 112 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication devices 111 and 112 and wireless control system 110.

Wireless control system 110 comprises RF communication circuitry and an antenna. Some examples of wireless control system 110 includes a base transceiver station (BTS), base station controller (BSC), radio base station (RBS), Node B, enhanced Node B (eNode B), and others. The RF communication circuitry typically includes amplifiers, filters, RF modulators, and signal processing circuitry and software. Wireless control system 110 may also comprise routers, servers, memory devices, software, processing circuitry, cabling, power supplies, network communication interfaces, structural supports. Wireless network protocols that may be utilized by wireless control system 110 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Wireless links 101 and 102 use the air or space as the transport media. Wireless links 101 and 102 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof.

Communication links 106 and 107 use metal, glass, air, space, or some other material as the transport media. Communication links 106 and 107 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 106 and 107 could be a direct link or may include intermediate networks, systems, or devices.

Communication network 120 may also comprise routers, servers, memory devices, software, processing circuitry, cabling, power supplies, network communication interfaces, and structural supports.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method operating a wireless communication system to control transmission of overhead messages, the method comprising:
   receiving and processing call information to identify a rate of call originations;
   processing the rate of call originations to determine whether the rate of call originations exceeds a threshold;
   determining a first priority scheme that identifies a first priority for transmitting the plurality of overhead messages based on a plurality of message types;
   transmitting the overhead messages using the first priority scheme if the rate of call originations is below the threshold;
   determining a second priority scheme that identifies a second priority for transmitting the plurality of overhead messages based on the plurality of message types if the rate of call originations exceeds the threshold, wherein the second priority scheme is different from the first priority scheme;
   transmitting the overhead messages using the second priority scheme if the rate of call originations exceeds the threshold;
   wherein the second priority scheme indicates a higher priority for a first type of message of the plurality of message types and a lower priority for a second type of message of the plurality of message types than the first priority scheme; and
   wherein the second priority scheme indicates that a plurality of messages of the first type of message be transmitted in the same control channel cycle.

2. The method of claim 1, wherein the first type of message comprises parameter messages including access parameter messages and sector parameter messages.

3. The method of claim 1, wherein the second priority scheme indicates an increased frequency for transmitting the first type of message.

4. The method of claim 1, wherein the second priority scheme indicates that the plurality of messages of the first type of message be transmitted in the same control channel capsule.

5. The method of claim 1 wherein the second type of message comprises paging messages.

6. The method of claim 1 wherein the second type of message comprises quick configuration messages.

7. The method of claim 1 wherein the call originations comprise voice call originations from one or more of a plurality of wireless communication devices and the threshold is set to increase network access speed for the voice call originations.

8. The method of claim 1 wherein the call originations comprise page originations from one or more of a plurality of wireless communication devices and the threshold is set to increase network access speed for the page originations.

9. A wireless communication system to control transmission of overhead messages, the system comprising:
   a processing system configured to process call information to identify a rate of call originations, and process the rate of call originations to determine whether the rate of call originations exceeds a threshold;
   a communication transceiver configured to receive call information, transmit the overhead messages including a plurality of message types using a first priority scheme that identifies a first priority for transmitting the plurality of overhead messages based on the plurality of message types if the rate of call originations is below the threshold, and transmit the overhead messages using a second priority scheme that identifies a second priority for transmitting the plurality of overhead messages based on the plurality of message types if the rate of call originations exceeds the threshold, wherein the second priority scheme is different than the first priority; and
   wherein the second priority scheme indicates a higher priority for a first type of message of the plurality of message types and a lower priority for a second type of message of the plurality of message types than the first priority scheme;
   wherein the second priority scheme indicates that a plurality of messages of the first type of message be transmitted in the same control channel cycle.

10. The wireless communication system of claim 9, wherein the first type of message comprises parameter messages including access parameter messages and sector parameter messages.

11. The wireless communication system of claim 9, wherein the second priority scheme indicates an increased frequency for transmitting the first type of message.

12. The wireless communication system of claim 9, wherein the second priority scheme indicates that the plurality of messages of the first type of message be transmitted in the same control channel capsule.

13. The wireless communication system of claim 9 wherein the second type of message comprises one or more of paging messages and quick configuration messages.

14. The wireless communication system of claim 9 wherein the call originations comprise voice call originations from one or more of a plurality of wireless communication devices and the threshold is set to increase network access speed for the voice call originations.

15. The wireless communication system of claim 9 wherein the call originations comprise page originations from one or more of a plurality of wireless communication devices and the threshold is set to increase network access speed for the page originations.

16. A non-transitory computer readable medium having program instructions stored thereon to control transmission of overhead messages that, when executed by a wireless communication system, direct the wireless communication system to:
- receive and process call information to identify a rate of call originations;
- process the rate of call originations to determine if the rate of call originations exceeds a threshold;
- determining a first priority scheme that identifies a first priority for transmitting a plurality of messages types with the overhead messages if the rate of call originations is below the threshold;
- transmit the overhead messages using the first priority scheme if the rate of call origination is below the threshold;
- a second priority scheme that identifies a second priority for transmitting the plurality of message types within the overhead messages if the rate of call originations exceeds the threshold, wherein the second priority scheme is different than the first priority scheme;
- transmit the overhead messages using the second priority scheme if the rate of call originations exceeds the threshold;
- wherein the second priority scheme indicates a higher priority for a first type of message of the plurality of message types and a lower priority for a second type of message of the plurality of message types than the first priority scheme; and
- wherein the second priority scheme indicates that a plurality of messages of the first type of message be transmitted in the same control channel cycle.

* * * * *